(12) United States Patent
Hiasa

(10) Patent No.: US 12,445,057 B2
(45) Date of Patent: Oct. 14, 2025

(54) SWITCHING CONTROL CIRCUIT AND POWER SUPPLY CIRCUIT

(71) Applicant: FUJI ELECTRIC CO., LTD., Kawasaki (JP)

(72) Inventor: Nobuyuki Hiasa, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 275 days.

(21) Appl. No.: 18/357,330

(22) Filed: Jul. 24, 2023

(65) Prior Publication Data

US 2024/0055974 A1 Feb. 15, 2024

(30) Foreign Application Priority Data

Aug. 10, 2022 (JP) ................. 2022-128231

(51) Int. Cl.
| | | |
|---|---|---|
| *H02M 3/335* | (2006.01) | |
| *H02M 1/00* | (2006.01) | |
| *H02M 1/10* | (2006.01) | |

(52) U.S. Cl.
CPC ..... *H02M 3/33507* (2013.01); *H02M 1/0009* (2021.05); *H02M 1/0025* (2021.05); *H02M 1/10* (2013.01)

(58) Field of Classification Search
CPC .... H02M 1/0009; H02M 1/10; H02M 1/0025; H02M 3/33507
See application file for complete search history.

(56) References Cited

U.S. PATENT DOCUMENTS

| | | | |
|---|---|---|---|
| 11,165,337 B2* | 11/2021 | Hiasa ................. | H02M 1/4208 |
| 11,233,448 B2 | 1/2022 | Endo et al. | |
| 2009/0103335 A1 | 4/2009 | Nakamura | |
| 2010/0165683 A1* | 7/2010 | Sugawara .......... | H02M 1/4225 |
| | | | 363/126 |
| 2011/0261592 A1 | 10/2011 | Samejima et al. | |

(Continued)

FOREIGN PATENT DOCUMENTS

| | | |
|---|---|---|
| JP | 2003-219635 A | 7/2003 |
| JP | 2005-176587 A | 6/2005 |

(Continued)

*Primary Examiner* — Jue Zhang
*Assistant Examiner* — Lakaisha Jackson
(74) *Attorney, Agent, or Firm* — Rabin & Berdo, P.C.

(57) ABSTRACT

A switching control circuit for a power supply circuit generating an output voltage from an AC voltage. The power supply circuit includes an inductor receiving a first rectified voltage corresponding to the AC voltage, and a transistor controlling an inductor current flowing through the inductor. The switching control circuit controls switching of the transistor, and comprises: an identification circuit identifying whether an effective value of the AC voltage is a first or second level; a first comparator circuit comparing the inductor current with a first current value and a second current value, respectively when the effective value is the first level and the second level; and a driver circuit driving the transistor based on the inductor current and the output voltage. The driver circuit turns off the transistor in response to the inductor current exceeding the first current value or the second current value as a result of comparison.

8 Claims, 13 Drawing Sheets

(56) References Cited

U.S. PATENT DOCUMENTS

| | | | | |
|---|---|---|---|---|
| 2012/0250381 A1* | 10/2012 | Takahashi | ............ | H02M 1/4225 |
| | | | | 363/124 |
| 2014/0160801 A1 | 6/2014 | Stamm | | |
| 2016/0149500 A1 | 5/2016 | Stamm | | |
| 2017/0201181 A1 | 7/2017 | Yabuzaki | | |
| 2019/0334431 A1* | 10/2019 | Spohn | ................ | H02M 3/1557 |

FOREIGN PATENT DOCUMENTS

| | | |
|---|---|---|
| JP | 2009-106038 A | 5/2009 |
| JP | 2013-192329 A | 9/2013 |
| JP | 2013-192406 A | 9/2013 |
| JP | 2014-027803 A | 2/2014 |
| JP | 2014-116307 A | 6/2014 |
| JP | 2017-005949 A | 1/2017 |
| JP | 2017-127109 A | 7/2017 |
| JP | 2020-202677 A | 12/2020 |
| JP | 7004113 B2 | 1/2022 |
| WO | 2011/132275 A1 | 10/2011 |

* cited by examiner

| CONDITION | TYPE | EFFECTIVE VALUE | OVERCURRENT |
|---|---|---|---|
| A | ISORATED POWER SUPPLY CIRCUIT (FLYBACK TYPE, ETC.) | LARGE (240V) | I1 |
| B | | SMALL (100V) | I2(>I1) |
| | NON-ISORATED POWER SUPPLY CIRCUIT (PFC, ETC.) | LARGE (240V) | |
| | | SMALL (100V) | |

FIG. 4

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2022-128231 filed on Aug. 10, 2022, the entire disclosure of which is hereby incorporated by reference herein.

BACKGROUND

Technical Field

The present disclosure relates to a switching control circuit and a power supply circuit.

Description of the Related Art

There have been power supply circuits each generating an output voltage of a target level from an alternating current (AC) voltage (see, for example, Japanese Patent No. 7004113, Japanese Patent Application Publication No. 2014-116307).

In such a power supply circuit generating an output voltage from an AC voltage, when the effective value of the AC voltage rises, large surge voltage may be generated at startup of the power supply circuit, which may break a power transistor.

SUMMARY

A first aspect of an embodiment of the present disclosure is a switching control circuit for a power supply circuit that is a first power supply circuit or a second power supply circuit, the power supply circuit being configured to receive an alternating current (AC) voltage and to generate an output voltage from the AC voltage, and including an inductor configured to receive a first rectified voltage corresponding to the AC voltage, and a transistor configured to control an inductor current flowing through the inductor, the switching control circuit being configured to control switching of the transistor, the switching control circuit comprising: an identification circuit configured to identify whether an effective value of the AC voltage is a first level or a second level lower than the first level; a first comparator circuit configured to, in a first case in which the effective value is the first level and the power supply circuit is the first power supply circuit, compare the inductor current with a first current value, and in a second case in which the effective value is the second level and the power supply circuit is the first power supply circuit or the second power supply circuit, compare the inductor current with a second current value larger than the first current value; and a driver circuit configured to drive the transistor, based on the inductor current and the output voltage, wherein the driver circuit is configured to turn off the transistor, in response to the inductor current exceeding a current value to be compared out of the first current value and the second current value.

A second aspect of an embodiment of the present disclosure is a switching control circuit for a power supply circuit configured to receive an alternating current (AC) voltage and to generate an output voltage from the AC voltage, the power supply circuit including an inductor configured to receive a first rectified voltage corresponding to the AC voltage, and a transistor configured to control an inductor current flowing through the inductor, the switching control circuit being configured to control switching of the transistor, the switching control circuit comprising: an identification circuit configured to identify whether an effective value of the AC voltage is a first level or a second level lower than the first level; a first comparator circuit configured to, when the effective value is the first level, compare the inductor current with a first current value, and when the effective value is the second level, compare the inductor current with a second current value larger than the first current value; and a driver circuit configured to drive the transistor, based on the inductor current and the output voltage, wherein the driver circuit is configured to turn off the transistor, in response to the inductor current exceeding a current value to be compared out of the first current value and the second current value.

A third aspect of an embodiment of the present disclosure is a power supply circuit that is an isolated power supply circuit configured to generate an output voltage of a target level from an alternating current (AC) voltage, the power supply circuit comprising: an inductor configured to receive a rectified voltage corresponding to the AC voltage; a transistor configured to control an inductor current flowing through the inductor; and a switching control circuit configured to control switching of the transistor, wherein the switching control circuit includes an identification circuit configured to identify whether an effective value of the AC voltage is a first level or a second level lower than the first level, a first comparator circuit configured to, when the effective value is the first level, compare the inductor current with a first current value, and when the effective value is the second level, compare the inductor current with a second current value larger than the first current value, and a driver circuit configured to drive the transistor, based on the inductor current and the output voltage; and the driver circuit is configured to turn off the transistor, in response to the inductor current exceeding a current value to be compared out of the first current value and the second current value.

BRIEF DESCRIPTION OF THE DRAWINGS

FIG. 4 is a table for explaining an overcurrent value under conditions A, B.

FIG. 9 is a chart for explaining a voltage Vcs when an NMOS transistor 305 is turned on.

DETAILED DESCRIPTION

Figure 1:
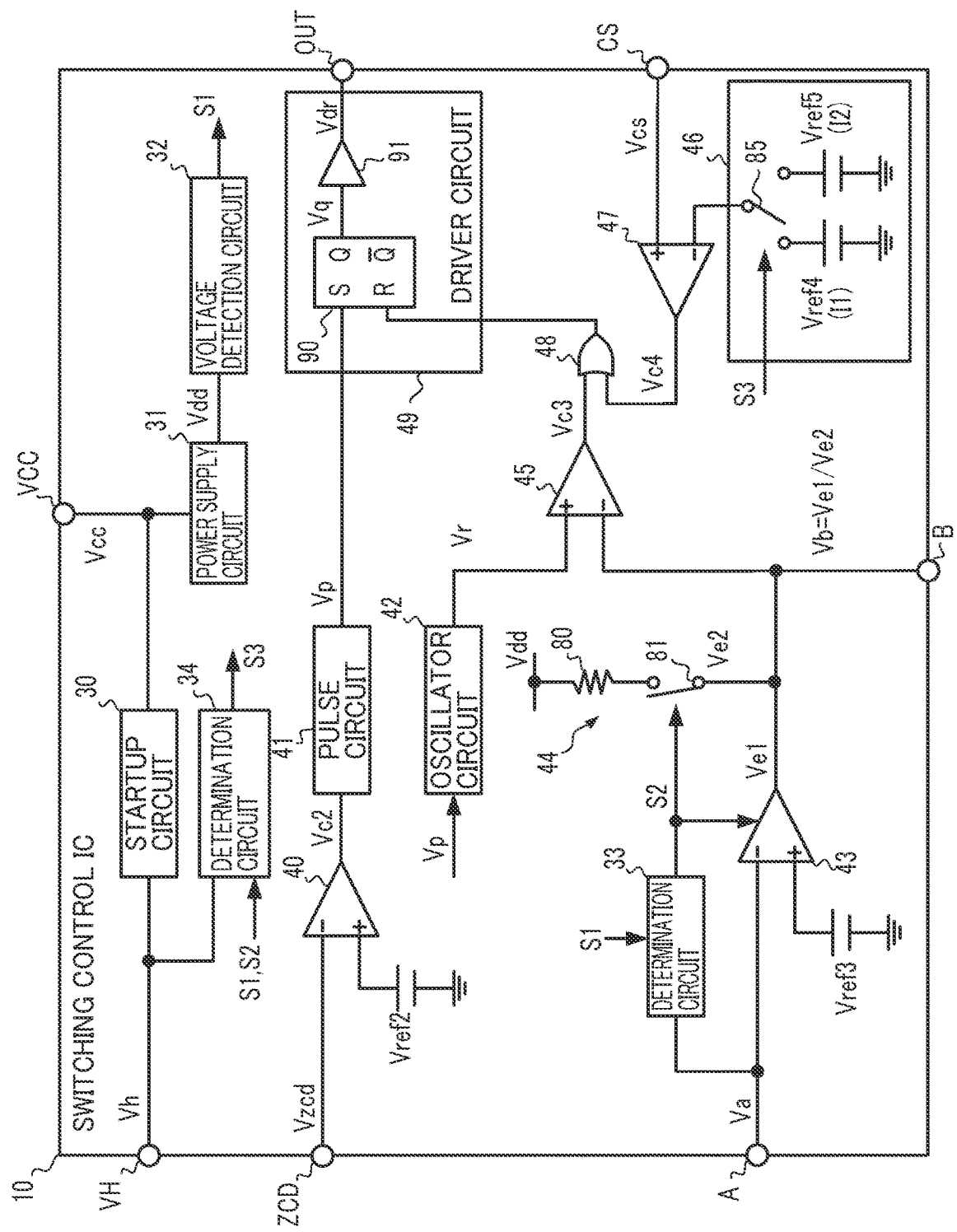
FIG. 1 is a diagram illustrating an example of a switching control IC 10.

At least following matters will become apparent from the descriptions of the present specification and the accompanying drawings. Herein, the same or equivalent constituent elements, members, and the like illustrated in the drawings are given the same reference signs, and repetitive description thereof is omitted for convenience.

In an embodiment of the present disclosure, the term "couple" means to electrically couple unless otherwise noted. Thus, "coupling" includes a case where two components are coupled not only through wiring but also through a resistor, for example.

===== Embodiments =====

<<<Configuration of Switching Control IC 10>>>

FIG. 1 is a diagram illustrating a configuration of a switching control IC 10 which is an embodiment of the present disclosure. The switching control IC 10 is an integrated circuit to determine whether the switching control IC 10 is used in a non-isolated power supply circuit or an isolated power supply circuit, and controls the operation of the power supply circuit in response to the result of the determination.

Specifically, the switching control IC 10 operates based on a feedback voltage corresponding to an output voltage, when used in the non-isolated switching power supply circuit. Meanwhile, the switching control IC 10 operates based on a current indicating an error of the output voltage from a target level, when used in the isolated switching power supply circuit.

The switching control IC 10 has terminals VH, VCC, ZCD, A, B, CS, and OUT. Note that the switching control IC 10 has, for example, a GND terminal to receive a ground voltage and other terminals, however, they are omitted here, for convenience.

The terminal VH is to receive a rectified voltage Vh obtained by rectifying an alternating current (AC) voltage. Note that the rectified voltage Vh corresponds to a "second rectified voltage".

The terminal VCC is to receive a power supply voltage Vcc to operate the switching control IC 10.

The terminal ZCD is to detect a voltage corresponding to an inductor current IL of the power supply circuit that uses the switching control IC 10. A circuit to detect whether the inductor current IL reaches zero is coupled to the terminal ZCD, which will be described later in detail.

The terminal A is to receive a voltage to determine the power supply circuit that uses the switching control IC 10 is non-isolated or isolated. Further, when the switching control IC 10 is used in the non-isolated power supply circuit, a feedback voltage corresponding to the output voltage of the power supply circuit is applied to the terminal A.

When the switching control IC 10 is used in the isolated power supply circuit, a circuit to apply a predetermined voltage is coupled to the terminal A, which will be described later in detail. Note that, in an embodiment of the present disclosure, the voltage at the terminal A is referred to as voltage Va.

The terminal B is a terminal to which elements for phase compensation are coupled when the switching control IC 10 is used in the non-isolated power supply circuit, meanwhile, a phototransistor is coupled when the switching control IC 10 is used in the isolated power supply circuit. Note that, in an embodiment of the present disclosure, the voltage at the terminal B is referred to as voltage Vb.

The terminal CS is to detect the inductor current IL of the power supply circuit that uses the switching control IC 10. A circuit to detect whether the inductor current IL reaches overcurrent is coupled to the terminal CS, which will be described later in detail.

The terminal OUT is to receive a driving signal Vdr to control switching of a switching device.

The switching control IC 10 includes a startup circuit 30, a power supply circuit 31, a voltage detection circuit 32, determination circuits 33, 34, comparators 40, 45, 47, a pulse circuit 41, an oscillator circuit 42, an error amplifier circuit 43, an error voltage output circuit 44, a reference voltage output circuit 46, an OR circuit 48, and a driver circuit 49.

===Startup Circuit 30===

The startup circuit 30 generates the power supply voltage Vcc, based on the rectified voltage Vh, when the power supply voltage Vcc is lower than a predetermined level. Specifically, the startup circuit 30 charges a capacitor (described later) coupled to the terminal VCC to generate the voltage Vcc, based on the rectified voltage Vh.

===Power Supply Circuit 31===

The power supply circuit 31 is a circuit (e.g., series regulator) to generate a power supply voltage Vdd to operate circuits internal to the switching control IC 10, based on the power supply voltage Vcc. Note that circuits to which the power supply voltage Vdd is supplied, among circuits included in the switching control IC 10, correspond to circuits other than a buffer circuit 91 (described later) of the driver circuit 49. In an embodiment of the present disclosure, the buffer circuit 91 of the driver circuit 49 operates based on the power supply voltage Vcc.

===Voltage Detection Circuit 32===

The voltage detection circuit 32 is to detect whether the power supply voltage Vdd reaches a predetermined level V1. Note that the "predetermined level V1" is a level indicating that the power supply voltage Vdd has been started up, and when the target level of the power supply voltage Vdd is 5 V, the "predetermined level V1" is, for example, 4.5 V. The voltage detection circuit 32 changes the level of a signal S1 from a low level (hereinafter, referred to as low or low level) to a high level (hereinafter, referred to as high or high level), in response to the power supply voltage Vcc rising to the predetermined level V1.

===Determination Circuit 33===

The determination circuit 33 is to determine whether the switching control IC 10 is used in the non-isolated power supply circuit or the isolated power supply circuit, based on the voltage Va at the terminal A, in response to the power supply voltage Vdd starting up and the signal S1 going high.

Figure 2A:
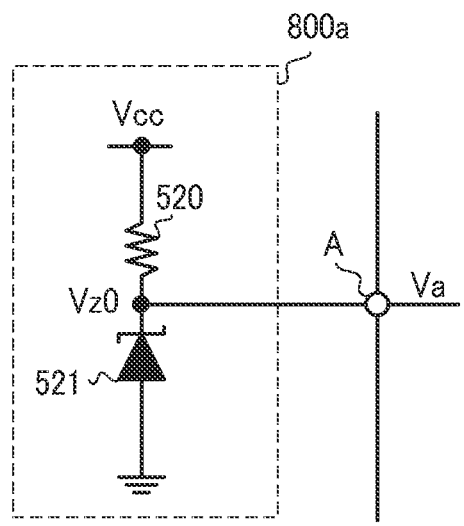
FIG. 2A is a diagram illustrating a state in which a circuit 800a is coupled to a terminal A.
Figure 2B:
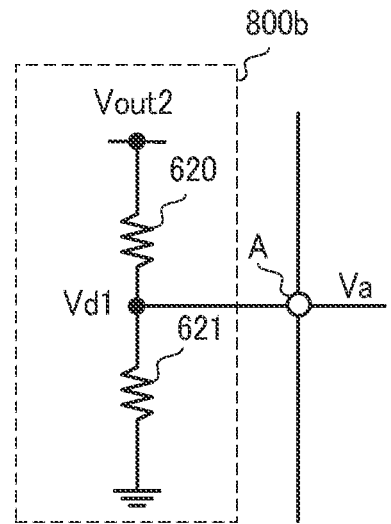
FIG. 2B is a diagram illustrating a state in which a circuit 800b is coupled to a terminal A.
Figure 2C:
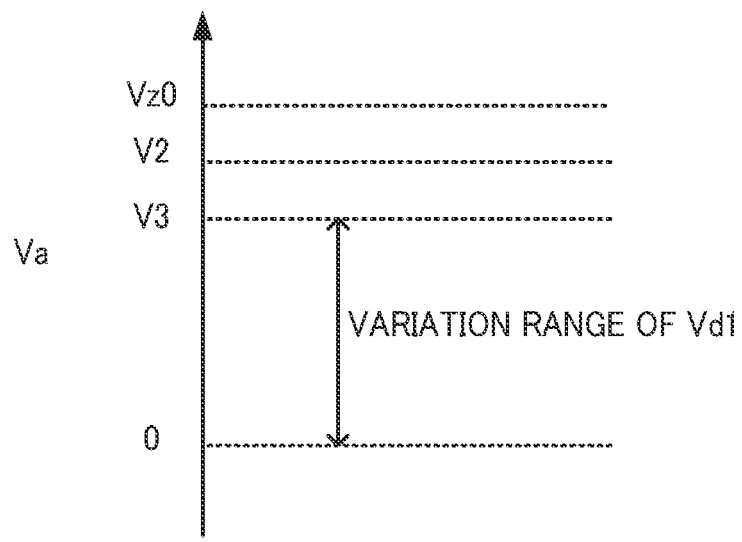
FIG. 2C is a chart for explaining the voltage level at a terminal A.

Specifically, the determination circuit 33 determines that the switching control IC 10 is used in the non-isolated power supply circuit, in response to the level of the voltage Va being lower than a predetermined level V2 (described later), meanwhile determines that the switching control IC 10 is used in the isolated power supply circuit, in response to the level of the voltage Va being higher than the predetermined level V2. FIGS. 2A to 2C are diagrams for explaining the relationship between the voltage Va and an external circuit coupled to the terminal A.

<When External Circuit Used in Isolated Power Supply Circuit is Coupled>

First, as illustrated in FIG. 2A, a description will be given of the case where a circuit 800a used in the isolated power supply circuit is coupled to the terminal A. Here, the circuit 800a includes a resistor 520 and a Zener diode 521. Further, in response to the power supply voltage Vcc being applied to the resistor 520, a breakdown voltage Vz0 of the Zener diode 521 is generated. In other words, in response to the power supply voltage Vcc being applied to the circuit 800a, the breakdown voltage Vz0 is applied to the terminal A.

<When Circuit Used in Non-Isolated Power Supply Circuit is Coupled>

Next, as illustrated in FIG. 2B, a description will be given of the case where a circuit 800b used in the non-isolated power supply circuit is coupled to the terminal A. Here, the circuit 800b is a voltage divider circuit that includes resistors 620, 621.

The circuit 800b generates a divided voltage Vd1 obtained by dividing an output voltage Vout2 (described later) of the non-isolated power supply circuit. The output voltage Vout2 is controlled so as to reach a predetermined level (e.g., 400 V), which will be described later in detail. Accordingly, in an embodiment of the present disclosure, the level of the divided voltage Vd1 applied to the terminal A can be adjusted by adjusting the voltage division ratio of the resistors 620, 621.

<Voltage Va at the Terminal A>

FIG. 2C is a chart for explaining the relationship between the breakdown voltage Vz0 generated at the circuit 800a and the divided voltage Vd1 generated at the circuit 800b. When the output voltage Vout2 is not generated, the divided voltage Vd1 is 0 (zero) V as the minimum value.

Meanwhile, in response to the output voltage Vout2 reaching overvoltage, the divided voltage Vd1 reaches a predetermined level V3. Note that the power supply circuit according to an embodiment of the present disclosure stops operating, in response to the output voltage Vout2 reaching overvoltage, and thus when the circuit 800b is used, the maximum level of the divided voltage Vd1 is the predetermined level V3. In other words, the divided voltage Vd1 changes in a range from zero to the predetermined level V3.

In an embodiment of the present disclosure, the above-described predetermined level V2 of the determination circuit 33 is set higher than the predetermined level V3. Furthermore, here, the level of the breakdown voltage Vz0 is set higher than the predetermined level V2.

Accordingly, the determination circuit 33 can determine, based on the voltage Va at the terminal A, whether the circuit 800a or 800b is coupled to the terminal A, in other words, whether the switching control IC 10 is used in the isolated power supply circuit or the non-isolated power supply circuit.

Note that the determination circuit 33 according to an embodiment of the present disclosure outputs a low signal S2, upon determining that the switching control IC 10 is used in the non-isolated power supply circuit, meanwhile outputs a high signal S2, upon determining that the switching control IC 10 is used in the isolated power supply circuit.

===Determination Circuit 34===

The determination circuit 34 is to determine whether to use a current value I1 or a current value I2 larger than the current value I1, as a current value Ioc to detect overcurrent of the power supply circuit. The determination circuit 34 determines a current value to detect overcurrent, based on the effective value of an AC voltage Vac and the type of the power supply circuit that uses the switching control IC 10, which will be described later in detail. Note that the current value I1 corresponds to a "first current value", and the current value I2 corresponds to a "second current value".

Here, it is assumed, in an embodiment of the present disclosure, that the AC voltage Vac with an effective value of 100 V or 240 V is supplied to the power supply circuit. However, the effective value of the AC voltage Vac to be supplied thereto is not limited to 100 V, 240 V, but may also be other values (e.g., 200 V, 220 V, and the like).

Further, in an embodiment of the present disclosure, when the switching control IC 10 is used in the isolated power supply circuit with the effective value of the AC voltage Vac being 240 V, the current value Ioc to detect overcurrent is the current value I1, which will be described later in detail. Hereinafter, the condition that "the switching control IC 10 is used in the isolated power supply circuit, with the effective value of the AC voltage Vac being 240 V" is referred to as "condition A".

Meanwhile, when the effective value of the AC voltage Vac is 100 V and the switching control IC 10 is used in the isolated power supply circuit or the switching control IC 10 is used in the non-isolated power supply circuit, the current value Ioc to detect overcurrent is the current value I2. Hereinafter, the condition that "the effective value of the AC voltage Vac is 100 V and the switching control IC 10 is used in the isolated power supply circuit or the switching control IC 10 is used in the non-isolated power supply circuit" is referred to as "condition B".

Figure 3:
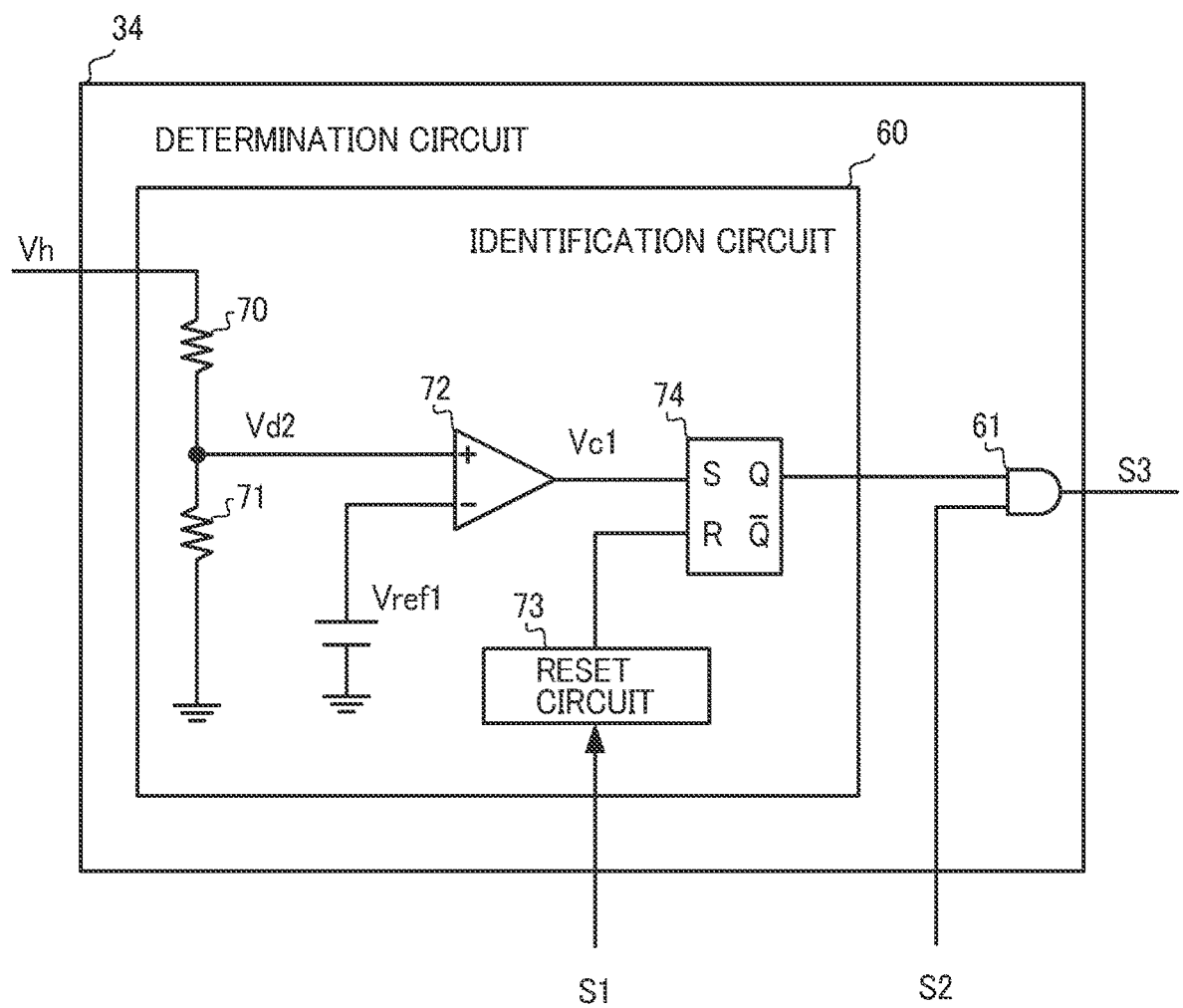
FIG. 3 is a diagram illustrating an example of a determination circuit 34.

Then, the determination circuit 34 determines which one of the above-described two conditions A and B is satisfied. The determination circuit 34 includes, as illustrated in FIG. 3, an identification circuit 60 and an AND circuit 61. Note that the case in which the condition A is satisfied corresponds to a "first case", and the case in which the condition B is satisfied corresponds to a "second case".

<<Identification Circuit 60>>

The identification circuit 60 identifies whether the effective value of the AC voltage Vac is, for example, 240 V or 100 V, based on the full-wave-rectified voltage Vh. Note that, here, 240 V corresponds to a "first level", and 100 V corresponds to a "second level lower than the first level". However, the effective values to be identified by the identification circuit 60 are not limited to 100 V, 240 V, but only have to be two effective values of different levels (e.g., 100 V and 200 V).

The identification circuit 60 includes resistors 70, 71, a comparator 72, a reset circuit 73, and an SR flip-flop 74. The resistors 70, 71 configure a voltage divider circuit to divide the full-wave-rectified voltage Vh. Note that the divided voltage generated by the resistors 70, 71 is referred to as divided voltage Vd2.

The comparator 72 compares the divided voltage Vd2 with a reference voltage Vref1. Here, the resistors 70, 71 and the reference voltage Vref1 are defined such that, when the effective value of the AC voltage Vac is 240 V, the maximum value of the divided voltage Vd2 is larger than the reference voltage Vref1, and when the effective value of the AC voltage Vac is 100 V, the maximum value of the divided voltage Vd2 is smaller than the reference voltage Vref1.

Accordingly, the comparator 72 outputs a high signal Vc1 when the effective value of the AC voltage Vac is 240 V, and outputs a low signal Vc1 when the effective value of the AC voltage Vac is 100 V. Note that the comparator 72 corresponds to a "second comparator circuit".

The reset circuit 73 outputs a reset signal to reset the SR flip-flop 74 (described later), in response to the power supply voltage Vdd reaching the predetermined level V1 and the signal S1 going high.

The SR flip-flop 74 changes an output Q to low in response to the reset signal from the reset circuit 73, and changes the output Q to high upon receiving the high signal Vc1 from the comparator 72.

Accordingly, in response to the comparator 72 detecting that the effective value of the AC voltage Vac is 240 V after the rectified voltage Vh is applied to the switching control IC 10, the SR flip-flop 74 hold the output Q high. Note that the SR flip-flop 74 corresponds to a "holding circuit", and the output Q held by the SR flip-flop 74 corresponds to a "result of identification".

<<AND circuit 61>>

The AND circuit 61 calculates the logical product of the output Q of the SR flip-flop 74 and the signal S2, to thereby output a resultant signal as a signal S3. The AND circuit 61 outputs the low signal S3 upon receiving the low signal S2 indicating that the switching control IC 10 is used in the non-isolated power supply circuit.

Meanwhile, the AND circuit 61 outputs the signal S3 of a logic level corresponding to the output Q of the SR flip-flop 74, upon receiving the high signal S2 indicating that the switching control IC 10 is used in the isolated power supply circuit.

Specifically, the AND circuit 61 outputs the high signal S3, in response to the signal S2 being high and the output Q of the SR flip-flop 74 being high (i.e., when the effective value of the AC voltage Vac is 240 V).

Further, the AND circuit 61 outputs the low signal S3 in response to the signal S2 being high and the output Q of the SR flip-flop 74 being low (i.e., when the effective value of the AC voltage Vac is 100 V).

Accordingly, the AND circuit 61 outputs the high signal S3, in response to the effective value of the AC voltage Vac being 240 V and the condition A for using the switching control IC 10 in the isolated power supply circuit being satisfied.

Meanwhile, the AND circuit 61 outputs the low signal S3, in response to the effective value of the AC voltage Vac being 100 V and the condition B for using the switching control IC 10 in the isolated power supply circuit or using the switching control IC 10 in the non-isolated power supply circuit being satisfied.

Accordingly, as illustrated in FIG. 4, the determination circuit 34 causes the signal S3 to be high such that the inductor current IL reaches overcurrent at the current value I1 when the condition A is satisfied. Further, the determination circuit 34 causes the signal S3 to be low such that the inductor current IL reaches overcurrent at the current value I2 (>the current value I1) when the condition B is satisfied.

Note that, as described above, the condition A corresponds to the case in which the switching control IC 10 is used in the isolated power supply circuit, with the effective value of the AC voltage Vac being 240 V. Further, the condition B corresponds to the case in which the switching control IC 10 is used in the isolated power supply circuit or the switching control IC 10 is used in the non-isolated power supply circuit, with the effective value of the AC voltage Vac being 100 V.

===Comparator 40===

The comparator 40 is a so-called zero current detection circuit, and detects whether the inductor current IL (described later) of the power supply circuit reaches zero, based on a voltage Vzcd at the terminal ZCD. It is assumed here that "zero" indicates such a current value (e.g., 0.1 mA) at which the inductor current IL reaches substantially zero, for example.

Thus, the comparator 40 compares the voltage Vzcd with a reference voltage Vref2 corresponding to a current of 0.1 mA, for example, to detect that the inductor current IL reaches zero. Note that the comparator 40 changes a signal Vc2 to low, upon detecting that the inductor current IL is zero.

===Pulse Circuit 41===

The pulse circuit 41 outputs a high pulse signal Vp, when it is detected that the inductor current IL is zero and the signal Vc2 goes low.

===Oscillator Circuit 42===

The oscillator circuit 42 outputs a ramp wave Vr whose amplitude gradually increases each time the high pulse signal Vp is received.

===Error Amplifier Circuit 43===

The error amplifier circuit 43 is a transimpedance amplifier to output a current corresponding to the difference between a reference voltage Vref3 and the voltage Va, when it is determined that the switching control IC 10 is used in the non-isolated power supply circuit and the low signal S2 is received. Note that the reference voltage Vref3 is determined according to the target level of the output voltage of the non-isolated power supply circuit. Further, here, the voltage applied to the terminal B is referred to as error voltage Ve1.

Further, the error amplifier circuit 43 stops operating, when it is determined that the switching control IC 10 is used in the isolated power supply circuit and the high signal S2 is received. Here, in response to the error amplifier circuit 43 stopping its operation, for example, the output of the error amplifier circuit 43 enters a high impedance state.

===Error Voltage Output Circuit 44===

The error voltage output circuit 44 is to output an error voltage Ve2 to causes the output voltage of the power supply circuit to reach the target level, when it is determined that the switching control IC 10 is used in the isolated power supply circuit and the high signal S2 is received, and the error voltage output circuit 44 includes a resistor 80 and a switch 81.

Note that, when the switching control IC 10 is used in the isolated power supply circuit, a phototransistor to generate a current corresponding to an error from the target level of the output voltage is coupled to the terminal B, which will be described later. Further, the error voltage output circuit 44 generates the error voltage Ve2, according to the current of the phototransistor.

In an embodiment of the present disclosure, the switch 81 is provided between the terminal B and the resistor 80 having one end to receive the power supply voltage Vdd. Then, the switch 81 coupled in series with the resistor 80 is turned on, upon receiving the high signal S2, and is turned off, upon receiving the low signal S2.

Thus, in response to the high signal S2 being received and the switch 81 being turned on, the current of the phototransistor (described later) flows through the resistor 80. Then, the error voltage Ve2 corresponding to an error from the target level of the output voltage is outputted from the resistor 80. Meanwhile, in response to the low signal S2 being received and the switch 81 being turned off, the output of the error voltage Ve2 is stopped.

As such, the error amplifier circuit 43 outputs the error voltage Ve1 when receiving the low signal S2, meanwhile, the error voltage output circuit 44 outputs the error voltage Ve2 when receiving the high signal S2.

Thus, in an embodiment of the present disclosure, only either one of the error amplifier circuit 43 or the error voltage output circuit 44 operates, to thereby output a voltage corresponding to an error of the output voltage. Note that the voltage applied to the terminal B is the voltage Vb, and thus, when the signal S2 is low, the voltage Vb results in the error voltage Ve1, meanwhile, when the signal S2 is high, the voltage Vb results in the error voltage Ve2.

===Comparator 45===

The comparator 45 compares the magnitude between the voltage Vb at the terminal B and the ramp wave Vr, to thereby output a signal Vc3 as the result of comparison. Here, the voltage Vb is applied to the inverting input terminal of the comparator 45, and the ramp wave Vr is applied to the non-inverting input terminal of the comparator 45. Thus, when the level of the ramp wave Vr is lower than the level of the voltage Vb, the signal Vc3 is low, meanwhile, when the level of the ramp wave Vr exceeds the level of the voltage Vb, the signal Vc3 goes high.

===Reference Voltage Output Circuit 46===

The reference voltage output circuit 46 selects and outputs, based on the logic level of the signal S3, a reference voltage Vref4, Vref5 for setting a current value Ioc at which the inductor current IL reaches overcurrent.

Here, the reference voltage Vref4 corresponds to the current value I1, and the reference voltage Vref5 corresponds to the current value I2 larger than the current value I1. Further, the reference voltage output circuit 46 includes a switch 85 to select the reference voltage Vref4, Vref5, based on the logic level of the inputted signal S3.

In an embodiment of the present disclosure, when the condition A for using the switching control IC 10 in the isolated power supply circuit with the effective value of the AC voltage Vac being 240 V is satisfied, and the high signal S3 is received, the switch 85 selects the reference voltage Vref4.

Further, when the condition B for using the switching control IC 10 in the isolated power supply circuit or using the switching control IC 10 in the non-isolated power supply circuit with the effective value of the AC voltage Vac being 100 V is satisfied, and the low signal S3 is received, the switch 85 selects the reference voltage Vref4.

Note that the reference voltage Vref4 corresponds to a "first reference voltage", and the reference voltage Vref5 corresponds to a "second reference voltage". Further, out of the current values I1, I2 respectively corresponding to the reference voltages Vref4, Vref5, a voltage selected at the switch 85 (i.e., the current value) corresponds to a "current value to be compared", which is to be compared with the inductor current IL.

===Comparator 47===

The comparator 47 outputs a signal Vc4 indicating whether the inductor current IL reaches overcurrent, based on a voltage Vcs at the terminal CS and the voltage from the reference voltage output circuit 46. Here, the voltage Vcs is applied to the non-inverting input terminal of the comparator 47, and the voltage of the reference voltage output circuit 46 is applied to the inverting input terminal of the comparator 47.

Thus, when the level of the voltage Vcs is lower than the level of the voltage of the reference voltage output circuit 46, the signal Vc4 is low, meanwhile, when the level of the voltage Vcs exceeds the level of the voltage of the reference voltage output circuit 46, the signal Vc4 goes high. Note that the comparator 47 corresponds to a "first comparator circuit".

===OR Circuit 48===

The OR circuit 48 outputs the logical sum of the signal Vc3 and the signal Vc4.

===Driver Circuit 49===

The driver circuit 49 turns on a power transistor upon receiving the pulse signal Vp, and turns off the power transistor upon receiving a high signal from the OR circuit 48. The driver circuit 49 includes an SR flip-flop 90, and the buffer circuit 91.

The pulse signal Vp is inputted to an input S of the SR flip-flop 90, and the output of the OR circuit 48 is inputted to an input R of the SR flip-flop 90. Thus, the output Q of the SR flip-flop 90 goes high, in response to the pulse signal Vp going high. Meanwhile, the output Q of the SR flip-flop 90 goes low upon receiving a high signal from the OR circuit 48.

The buffer circuit 91 outputs the driving signal Vdr to drive a switching device, based on the output Q of the SR flip-flop 90. Specifically, the buffer circuit 91 outputs the high driving signal Vdr in response to the output Q going high, and outputs the low driving signal Vdr in response to the output Q going low.

As described above, in an embodiment of the present disclosure, when the condition A is satisfied, the comparator 47 outputs the high signal Vc4, in response to the voltage Vcs exceeding the reference voltage Vref4. Thus, when the condition A is satisfied, the driver circuit 49 outputs the low driving signal Vdr, in response to the inductor current IL reaching the small current value I1.

Further, in an embodiment of the present disclosure, when the condition B is satisfied, the comparator 47 outputs the high signal Vc4, in response to the voltage Vcs exceeding the reference voltage Vref5. Thus, when the condition B is satisfied, the driver circuit 49 outputs the low driving signal Vdr, in response to the inductor current IL reaching the large current value I2.

<<< Example of Isolated Power Supply Circuit >>>

Figure 5:
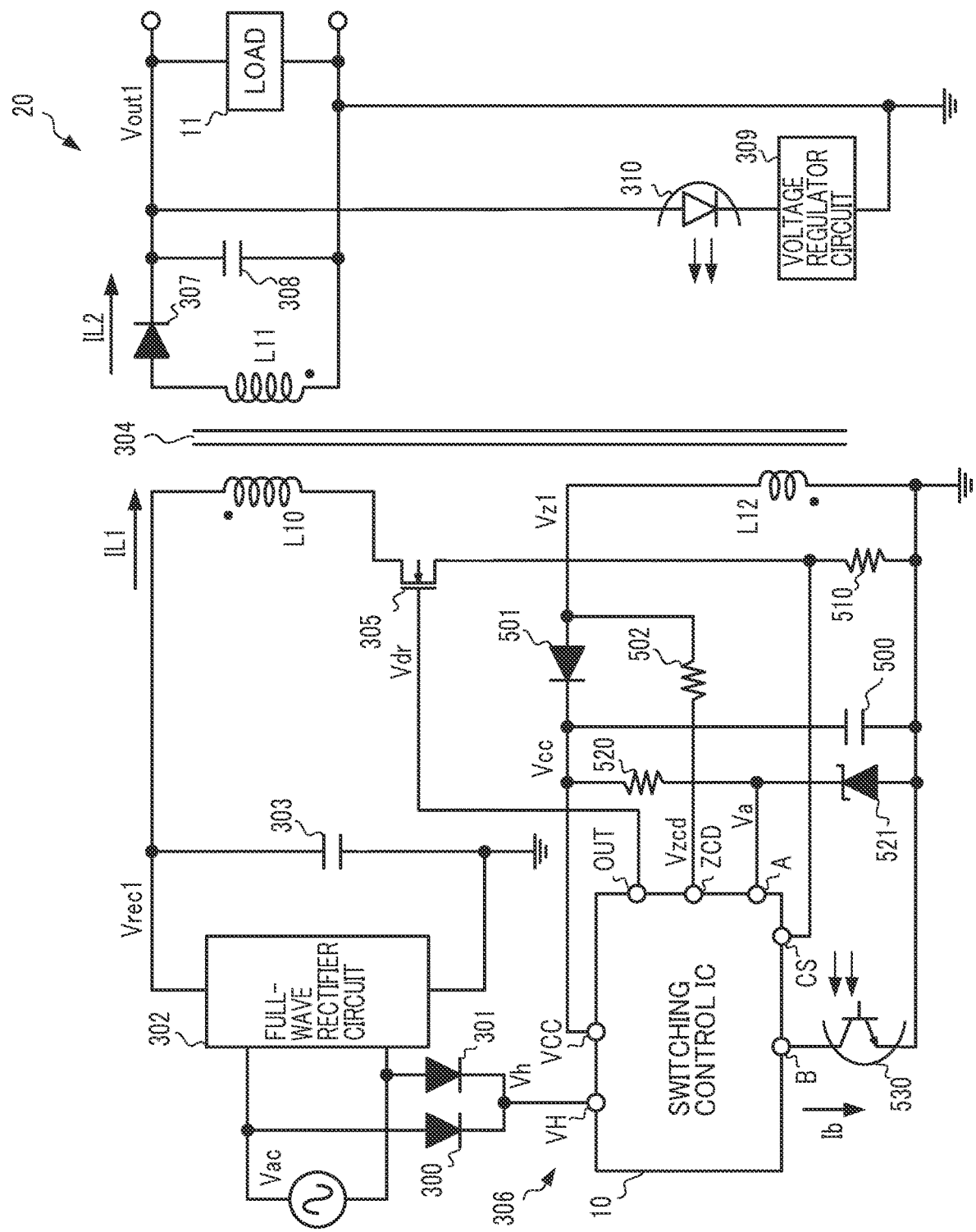
FIG. 5 is a diagram illustrating an example of an isolated power supply circuit 20.

FIG. 5 is a diagram illustrating a configuration example of an isolated power supply circuit 20. The power supply circuit 20 is a flyback AC-DC converter to generate, at a load 11, an output voltage Vout1 of the target level Vo1 (e.g., 15 V) from the AC voltage Vac of a commercial power supply. The load 11 in the power supply circuit 20 is, for example, a light-emitting diode for lighting, or the like. Further, the power supply circuit 20 corresponds to a "first power supply circuit".

The power supply circuit 20 includes diodes 300, 301, 307, a full-wave rectifier circuit 302, capacitors 303, 308, a transformer 304, an NMOS transistor 305, a control block 306, a voltage regulator circuit 309, and a light-emitting diode 310.

The diodes 300, 301 full-wave rectify the AC voltage Vac, to output a resultant voltage as the voltage Vh to the terminal VH of the switching control IC 10. Note that AC voltage Vac is, for example, a voltage in a range of 100 to 240 V with a frequency in a range of 50 to 60 Hz.

The full-wave rectifier circuit 302 full-wave rectify the AC voltage Vac, to thereby output a resulting voltage as a rectified voltage Vrec1 to the capacitor 303.

The capacitor 303 smooths the rectified voltage Vrec1 while removing noise thereof. Note that the smoothed rectified voltage Vrec1 is applied to the transformer 304. Note that the rectified voltage Vrec1 corresponds to a "first rectified voltage".

The transformer 304 includes a primary coil L10 (inductor), a secondary coil L11, and an auxiliary coil L12. The primary coil L10, the secondary coil L11, and the auxiliary coil L12 are insulated from one another.

In the transformer 304, a voltage is generated at the secondary coil L11 on the secondary side, according to a variation in the voltage across the primary coil L10 on the primary side, meanwhile, a voltage is generated at the auxiliary coil L12 on the primary side, according to a variation in the voltage at the primary coil L10.

Further, the drain of the NMOS transistor 305 is coupled to one end of the primary coil L10, and thus in response to switching of the NMOS transistor 305 being started, the voltage at the secondary coil L11 and the voltage at the auxiliary coil L12 vary. Note that the primary coil L10 and the secondary coil L11 are electromagnetically coupled with the opposite polarity, and the secondary coil L11 and the auxiliary coil L12 are electromagnetically coupled with the same polarity.

The control block 306 is a circuit block to control switching of the NMOS transistor 305, which will be described later in detail. It is assumed, in an embodiment of the present disclosure, that the NMOS transistor 305 is used as a power transistor, however, any transistor may be used as long as it is capable of controlling power.

The diode 307 rectifies the voltage at the secondary coil L11, and the capacitor 308 smooths the rectified voltage. As a result, the smoothed output voltage Vout1 is generated at the capacitor 308. Note that the output voltage Vout1 results in a direct-current (DC) voltage of the target level Vo1 (e.g., 15 V).

The voltage regulator circuit 309 generates a constant DC voltage, and is configured using a shunt regulator, for example.

The light-emitting diode 310 is an element to emit light with an intensity corresponding to the difference between the output voltage Vout1 and the output of the voltage regulator circuit 309, and configures a photocoupler with a phototransistor 530, which will be described later.

In an embodiment of the present disclosure, as the level of the output voltage Vout1 rises, the intensity of the light from the light-emitting diode 310 increases.

<<<Control Block 306>>>

The control block 306 includes the switching control IC 10, a capacitor 500, a diode 501, resistors 502, 510, 520, the Zener diode 521, and the phototransistor 530.

The switching control IC 10 is an integrated circuit to control switching of the NMOS transistor 305, which has been described with reference to FIG. 1.

One end of the capacitor 500 having the other end that is grounded and the cathode of the diode 501 are coupled to the terminal VCC. Thus, the capacitor 500 is charged with a current from the diode 501. The charge voltage of the capacitor 500 results in the power supply voltage Vcc to operate the switching control IC 10.

The resistor 502 is coupled between the terminal ZCD and the auxiliary coil L12. Thus, a voltage Vz1 generated at the auxiliary coil L12 is applied to the terminal ZCD as the voltage Vzcd. Further, as described above, a voltage of a polarity opposite to that of the primary coil L10 is generated at the auxiliary coil L12.

Thus, when an inductor current IL1 flowing through the primary coil L10 decreases, the positive voltage Vz1 is generated at the auxiliary coil L12, meanwhile, when the inductor current IL1 flowing through the primary coil L10 increases, the negative voltage Vz1 is generated at the auxiliary coil L12.

The NMOS transistor 305 and the resistor 510 are coupled to the terminal CS. The resistor 510 is to detect the inductor current IL1 when the NMOS transistor 305 is on. Thus, the voltage Vcs that corresponds to the inductor current IL1 and is obtained by converting the inductor current IL1 is applied to the terminal CS.

One end of the resistor 520, having the other end to receive the power supply voltage Vcc, and the cathode of the Zener diode 521 are coupled to the terminal A. Thus, when the power supply voltage Vcc is sufficiently rises, the voltage Va applied to the terminal A results in the breakdown voltage Vz0 of the Zener diode 521 (e.g., 5.1 V). Note that the resistor 520 and the Zener diode 521 are equivalent to the circuit 800a illustrated in FIG. 2A.

The terminal B is a terminal at which an error voltage indicating an error between the level of the output voltage Vout1 and the target level Vo1 is generated, and to which the phototransistor 530 is coupled. The phototransistor 530 passes a bias current Ib having a magnitude corresponding to the intensity of the light from the light-emitting diode 310, from the terminal B to the ground.

Thus, the phototransistor 530 operates as a transistor to generate a sink current. Note that an element such as a capacitor and the like to remove noise may be provided between the terminal B and the ground.

The gate of the NMOS transistor 305 is coupled to the terminal OUT, and thus the NMOS transistor 305 is switched in response to the driving signal Vdr.

===Switching Control IC 10 Used in Power Supply Circuit 20===

Figure 6:
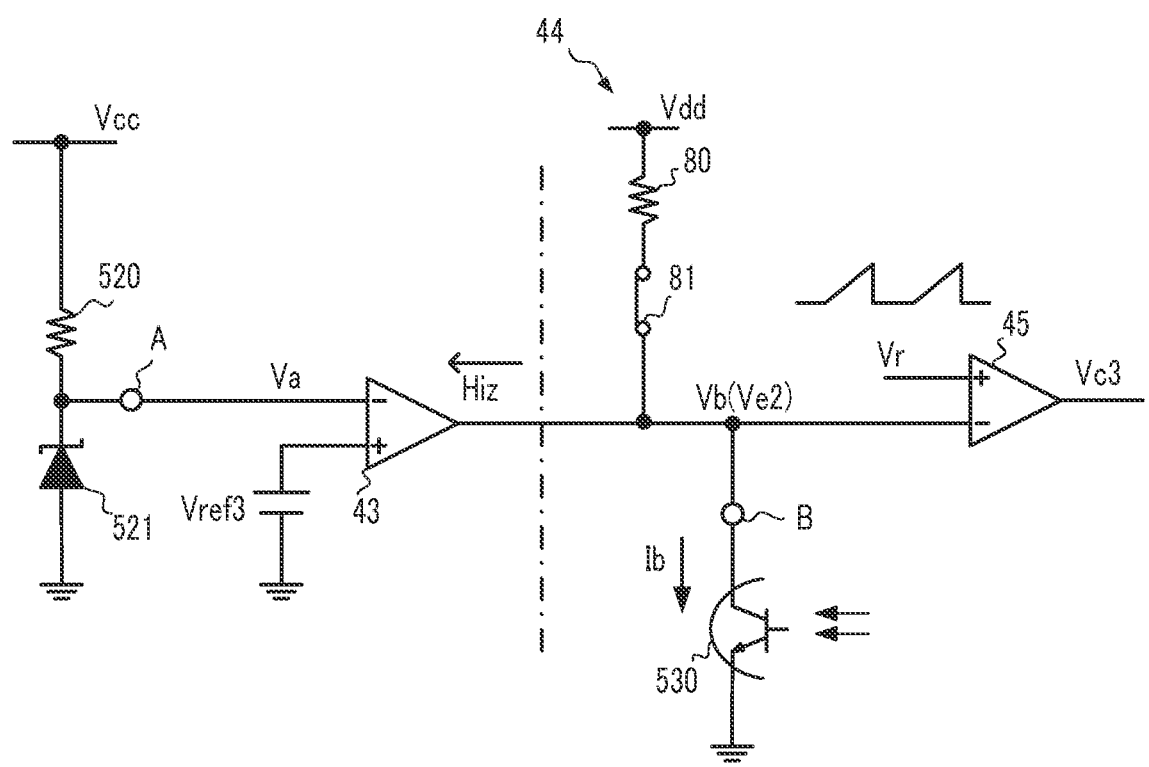
FIG. 6 is a diagram illustrating a configuration of a part of a switching control IC 10.

FIG. 6 is a diagram illustrating a configuration of a part of the switching control IC 10 used in the isolated power supply circuit 20. Here, the breakdown voltage Vz0 is applied to the terminal A, and thus only the error voltage output circuit 44 out of the error amplifier circuit 43 and the error voltage output circuit 44 operates. And, the output of the error amplifier circuit 43 enters the high impedance state, and thus the voltage Vb at the terminal B is not affected by the output of the error amplifier circuit 43.

===Operation of Switching Control IC 10 in Power Supply Circuit 20===

Figure 7:
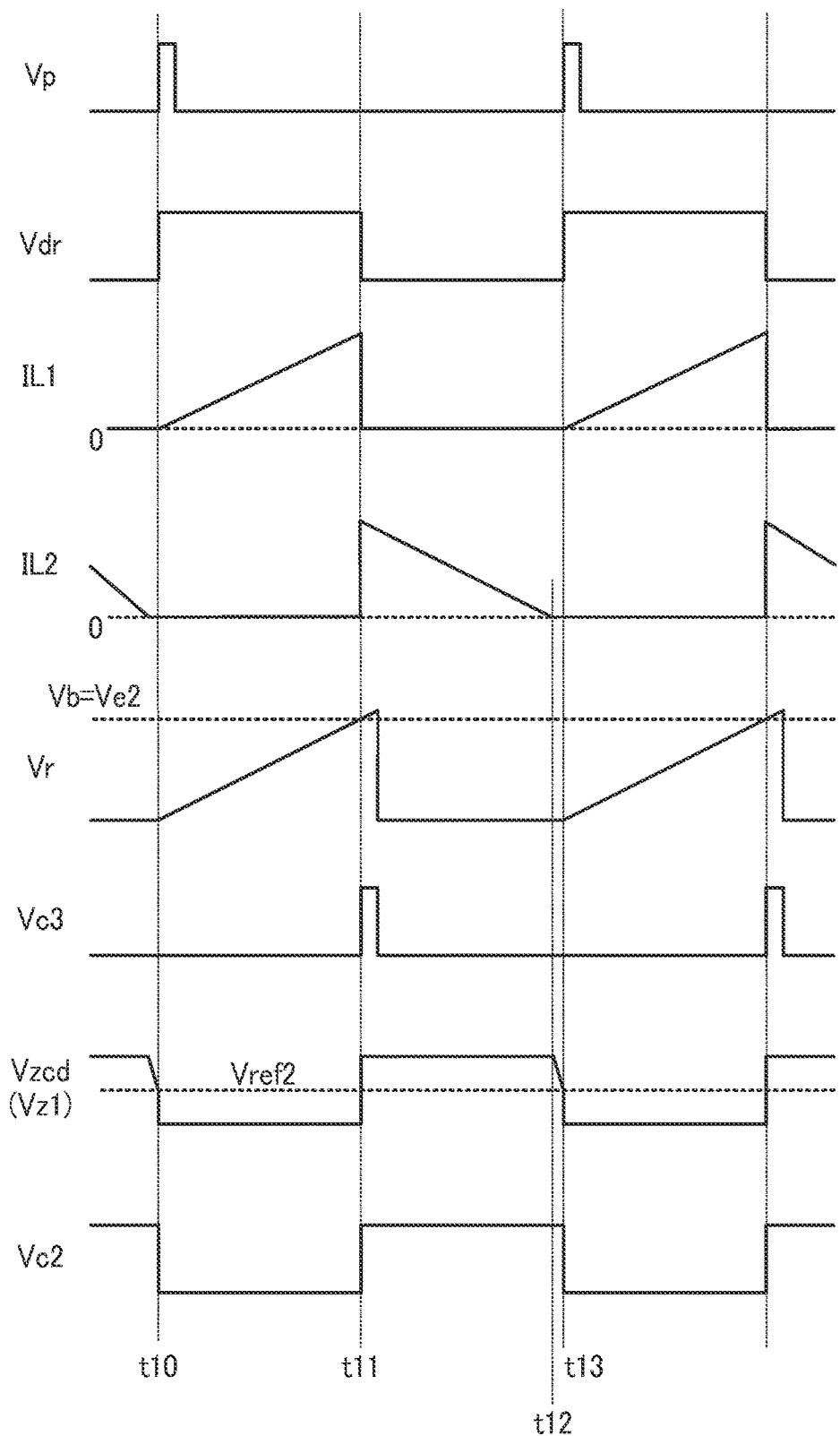
FIG. 7 is a chart for explaining the operation of a power supply circuit 20.

FIG. 7 is a chart for explaining the operation of the switching control IC 10 used in the power supply circuit 20.

First, in response to the pulse signal Vp being outputted at time t10, the driving signal Vdr goes high and the NMOS transistor 305 is turned on. As a result, the inductor current IL1 increases. Further, in response to the pulse signal Vp being outputted, the amplitude of the ramp wave Vr from the oscillator circuit 42 increases. Upon turning on of the NMOS transistor 305, the diode 307 is turned off and energy is stored in the transformer 304, since the secondary coil L11 is electromagnetically coupled with the opposite polarity.

Then, in response to the amplitude level of the ramp wave Vr exceeding the level of the voltage Vb (=Ve2) at time t11, the comparator 45 changes the signal Vc3 to high. As a result, the SR flip-flop 90 is reset, and the driving signal Vdr goes low.

In response to the driving signal Vdr going low, the NMOS transistor 305 is turned off. As a result, the inductor current IL1 rapidly decrease, and the voltage Vz1 at one end of the auxiliary coil L12, having the other end that is grounded, results in becoming positive. Further, the energy stored in the transformer 304 is outputted from the secondary coil L11 through the diode 307. As a result, the voltage Vzcd (=Vz1) exceeds the reference voltage Vref2, and thus the signal Vc2 from the comparator 40 goes high.

Then, in response to an inductor current IL2 of the secondary coil L11 reaching substantially zero at time t12, the voltage Vz1 at the auxiliary coil L12 magnetically coupled to the primary coil L10 rapidly drops. As a result, at time t13, the voltage Vzcd (=Vz1) drops below the reference voltage Vref2, and the signal Vc2 from the comparator 40 goes low.

In response to the signal Vc2 going low, the pulse signal Vp is outputted, and the NMOS transistor 305 is turned on. Then, the operation from time t10 to t13 is repeated from time t13.

<<Overcurrent>>

Note that, while the operation from time t10 to t13 is repeated, the inductor current IL1 may reach overcurrent. Here, when the effective value of the AC voltage Vac supplied to the power supply circuit 20 is 240 V, the condition A is satisfied. Thus, in response to the inductor current IL1 reaching the small current value I1, it is determined that the inductor current IL1 is overcurrent. Meanwhile, when the effective value of the AC voltage Vac supplied to the power supply circuit 20 is 100 V, the condition B is satisfied. Thus, in response to the inductor current IL1 reaching the large current value I2, it is determined that the inductor current IL1 is overcurrent.

The comparator 47 outputs the high signal Vc4, when it is determined that the inductor current IL1 is overcurrent. As a result, the driver circuit 49 turns off the NMOS transistor 305, thereby being able to prevent the inductor current IL1 from increasing exceeding overcurrent.

===Feedback Control===

Here, in response to the load 11 entering a light load state, the output voltage Vout1 rises above the target level Vo1. In this event, the current flowing through a shunt regulator (not illustrated) of the voltage regulator circuit 309 in FIG. 5 increases, and thus the current of the light-emitting diode 310 also increases.

Then, the phototransistor 530 increases the bias current Ib according to the degree of amplification of the light from the light-emitting diode 310, and thus the error voltage Ve2 (=Vb) drops. As a result, the time period during which the NMOS transistor 305 is on decreases, and thus the output voltage Vout1 drops.

Meanwhile, in response to the output voltage Vout1 dropping from the target level Vo1, the current of the light-emitting diode 310 decreases, contrary to the above. As a result, the bias current Ib decreases, and the error voltage Ve2 (=Vb) rises. Accordingly, the time period during which the NMOS transistor 305 is on increases, and the output voltage Vout1 rises.

As such, in the power supply circuit 20, the output voltage Vout1 is feedback-controlled so as to reach the target level Vo1. Accordingly, the switching control IC 10 is able to cause the isolated power supply circuit 20 to perform a desired operation.

===Operation of Power Supply Circuit 20 from Startup===

In FIG. 7, the operation waveforms of the power supply circuit 20 have been explained. Here, a description will be given of main waveforms of the power supply circuit 20 from when the power supply circuit 20 is started up to when the output voltage Vout1 at the target level Vo1 is generated, with reference to FIGS. 1, 5, and the like as appropriate.

Figure 8:
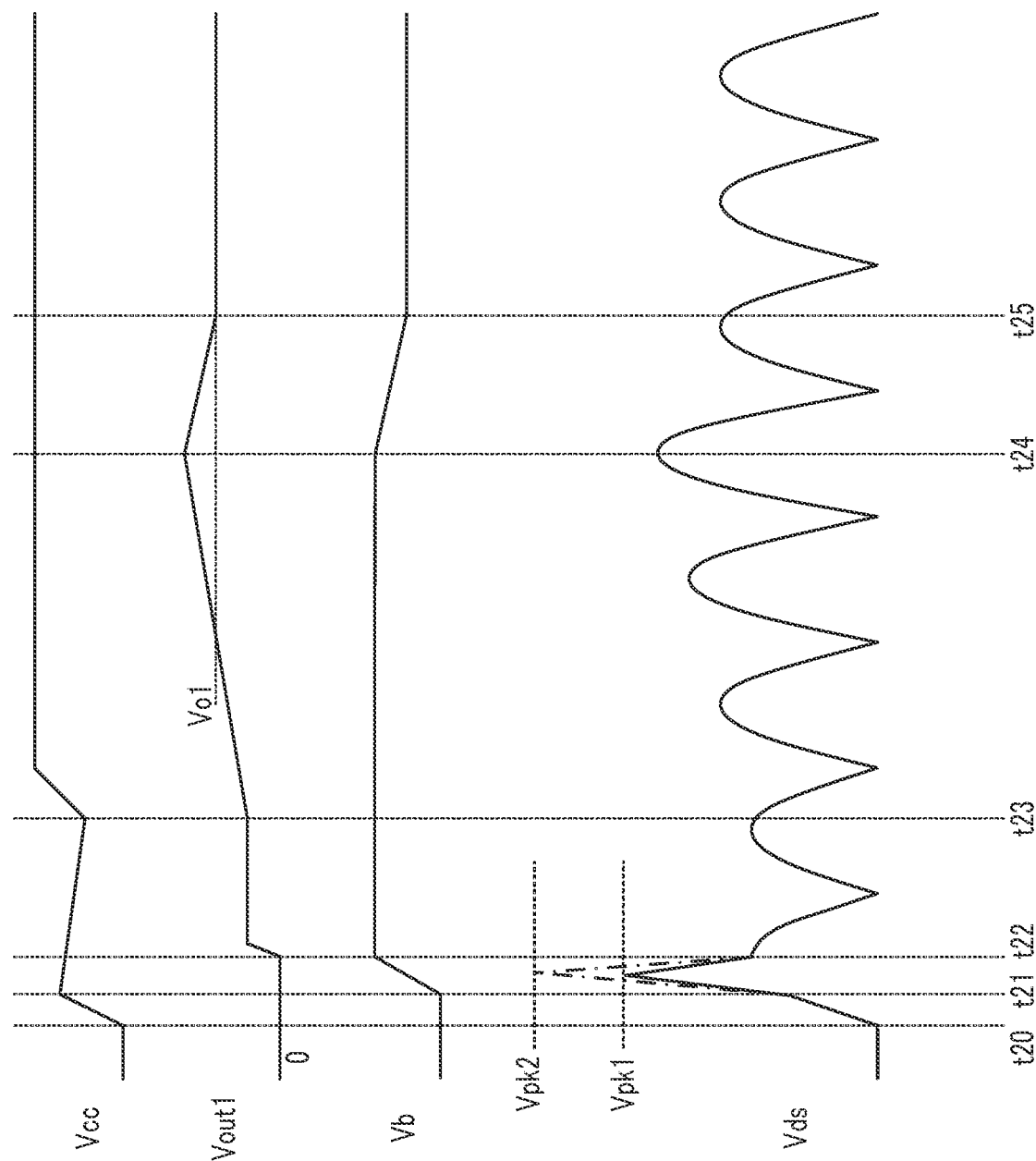
FIG. 8 is a chart for explaining the operation of a power supply circuit 20 at startup.

FIG. 8 is a chart illustrating main waveforms of the power supply circuit 20 when the AC voltage Vac is supplied to the power supply circuit 20. It is assumed here that the effective value of the AC voltage Vac is 240 V.

First, in response to the AC voltage Vac being supplied to the power supply circuit 20 at time t20, the rectified voltage Vh is supplied to the startup circuit 30. Accordingly, the startup circuit 30 charges the capacitor 500 of FIG. 5, and thus the power supply voltage Vcc gradually rises.

Further, in response to the AC voltage Vac being supplied to the power supply circuit 20, the rectified voltage Vrec1 also rises, and thus a drain-source voltage Vds of the NMOS transistor 305 (the lowest in FIG. 8) also gradually rises.

Although omitted in FIG. 8 for convenience, upon rising in the power supply voltage Vcc, the power supply circuit 31 of FIG. 1 starts generating the power supply voltage Vdd inside the switching control IC 10. As a result, in response to the power supply voltage Vdd reaching the predetermined level V1 by time t21, the voltage detection circuit 32 outputs the high signal S1, and the determination circuit 33 outputs the high signal S2 indicating that the switching control IC 10 is used in the isolated power supply circuit. Furthermore, the determination circuit 34 outputs the high signal S3, and thus the reference voltage output circuit 46 outputs the reference voltage Vref4 corresponding to the small current value I1.

Further, in response to the switching control IC 10 starting to switch the NMOS transistor 305 at time t21, the power supply voltage Vcc gradually decreases. Meanwhile, since the power supply voltage Vdd is applied to the terminal B, the voltage Vb gradually rises so as to be close to the level of the power supply voltage Vdd, while being affected by parasitic capacitance generated at the resistor 80 and the terminal B.

Here, upon rising in the level of the voltage Vb, the time period during which the NMOS transistor 305 is on increases. As a result, the energy stored in the primary coil L10 of the transformer 304 increases.

Incidentally, at time t21, switching of the NMOS transistor 305 has just started, and the output voltage Vout1 is 0 V. At the timing at which the supply of a current to the transformer 304 is started, the energy stored in the primary coil L10 of the transformer 304 is less easily transferred to the secondary coil L11 on the secondary side, due to the influence of the parasitic capacitance, excitation state and/or the like of the transformer 304.

As a result, the energy stored in the primary coil L10 when the NMOS transistor 305 is on appears as a large surge voltage on the primary side of the transformer 304 when the NMOS transistor 305 is turned off. As a result, the drain-source voltage Vds of the NMOS transistor 305 greatly rises in the timing from time t21.

Here, in the power supply circuit 20, the voltage Vds is given by the following Expression (1).

$$Vds = Vr + Vrec1 + Vsurge \quad (1)$$

where "Vr" is a so-called flyback voltage, and is given by Expression (2), and "Vsurge" is a surge voltage.

Further, the flyback voltage Vr is given by the following Expression (2).

$$Vr = (Vout1 + Vf) \times N1/N2 \quad (2)$$

where "Vf" is the forward voltage of the diode 307 on the secondary side, and "N1" is the number of turns of the primary coil L10, and "N2" is the number of turns of the secondary coil L11.

Here, the effective value of the AC voltage Vac is 240 V, and thus the rectified voltage Vrec1 in Expression (1) increases. Accordingly, a surge voltage Vsurge needs to be reduced in order to reduce the voltage Vds so as to prevent the NMOS transistor 305 from being broken.

Figure 9:
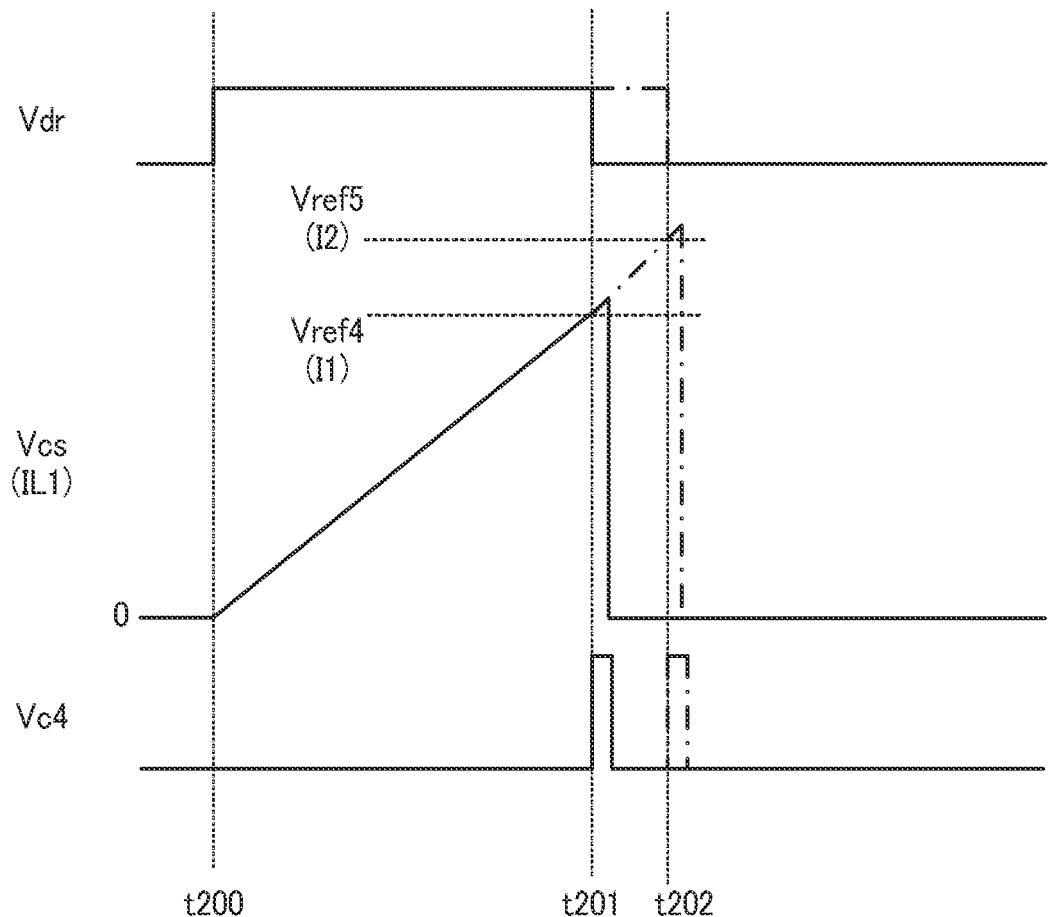

FIG. 9 is a chart for explaining an example of the driving signal Vdr and voltage Vcs (i.e., the inductor current IL1) from time t21 to t22 of FIG. 8. For example, in response to the driving signal Vdr going high at time t200, the NMOS transistor 305 is turned on, and thus the voltage Vcs rises with an increase in the inductor current IL1.

In an embodiment of the present disclosure, when the effective value of the AC voltage Vac is 240 V, the reference voltage Vref4 is selected such that the overcurrent of the inductor current IL1 is the small current value I1. Thus, in response to the voltage Vcs reaching the reference voltage Vref4 at time t201, the comparator 47 changes the signal Vc4 to high. As a result, the driver circuit 49 changes the driving signal Vdr to low, and turns off the NMOS transistor 305.

If the reference voltage Vref5 is selected such that the overcurrent of the inductor current IL1 is the large current value I2, the voltage Vcs reaches the reference voltage Vref5 at time t202. As a result, the comparator 47 changes the signal Vc4 to high at time t202, and the driver circuit 49 turns off the NMOS transistor 305.

Accordingly, in an embodiment of the present disclosure, the maximum value of the inductor current IL1 of the primary coil L10 can be reduced, and thus the surge voltage Vsurge generated when the NMOS transistor 305 is turned off can be reduced. As a result, as illustrated in time t21 to t22 in FIG. 8, for example, the peak of the voltage Vds can be reduced from a voltage Vpk2 (dashed-dotted line) to the voltage Vpk2 (solid line).

Note that the waveform of the voltage Vpk2 (dashed-dotted line) is a waveform when the large current value I2 is set as the overcurrent of the inductor current IL1, and the waveform of the voltage Vpk2 (solid line) is a waveform when the small current value I1 is set as the overcurrent of the inductor current IL1.

Then, at time t22 in FIG. 8, the energy stored in the primary coil L10 of the transformer 304 is transferred to the secondary coil L11 on the secondary side, and thus the output voltage Vout1 gradually rises. Then, from time t22, the output voltage Vout1 is generated, thereby easily transferring the energy from the primary coil L10 of the transformer 304 to the secondary coil L11.

As a result, the surge voltage Vsurge generated on the primary side decreases, when the NMOS transistor 305 is turned off. Further, from time t22, the power supply voltage Vcc gradually drops, and thus the level of the driving signal Vdr outputted from the buffer circuit 91 of the driver circuit 49 drops as well. Accordingly, the NMOS transistor 305 cannot be sufficiently on, and a rise in the output voltage Vout1 is retarded.

Thereafter, at time t23, the effect of parasitic capacitance of the transformer 304 and the like is reduced, and thus the energy stored in the primary coil L10 of the transformer 304 is efficiently transferred to the secondary coil L11 on the secondary side and the auxiliary coil L12. As a result, the output voltage Vout1 of the power supply circuit 20 and the power supply voltage Vcc rise.

From time t23, the output voltage Vout1 rises and exceeds the target level Vo1, however, at time t24, the light-emitting diode 310 reacts and emits light more intensely, which causes the phototransistor 530 to increase the bias current Ib. As a result, for example, at time t24, the voltage Vb drops, and the output voltage Vout1 also reaches the target level Vo1.

As such, in an embodiment of the present disclosure, for example, as illustrated in FIG. 4, even when the effective value of the AC voltage Vac is as large as 240 V, the overcurrent of the inductor current IL1 can be set to the small current value I1, and thus the surge voltage Vsurge can be reduced.

Note that, for example, when the effective value of the AC voltage Vac is 100 V, the rectified voltage Vrec1 decreases. Thus, in this case, from the above-described Expression (1), even if the overcurrent of the inductor current IL1 is set to the large current value I2, the fluctuation of the voltage Vds of the NMOS transistor 305 can be suppressed.

$$Vds = Vr + Vrec1 + Vsurge \qquad (1)$$

Further, when the effective value of the AC voltage Vac is 100 V, the overcurrent of the inductor current IL1 being set to the large current value I2 makes it possible to transfer more energy from the primary side to the secondary side in a short time period. Accordingly, the startup time of the output voltage Vout1 of the power supply circuit 20 (time period from 0 V to the target level Vo1) can be reduced.

<<< Example of Non-Isolated Power Supply Circuit >>>

Figure 10:
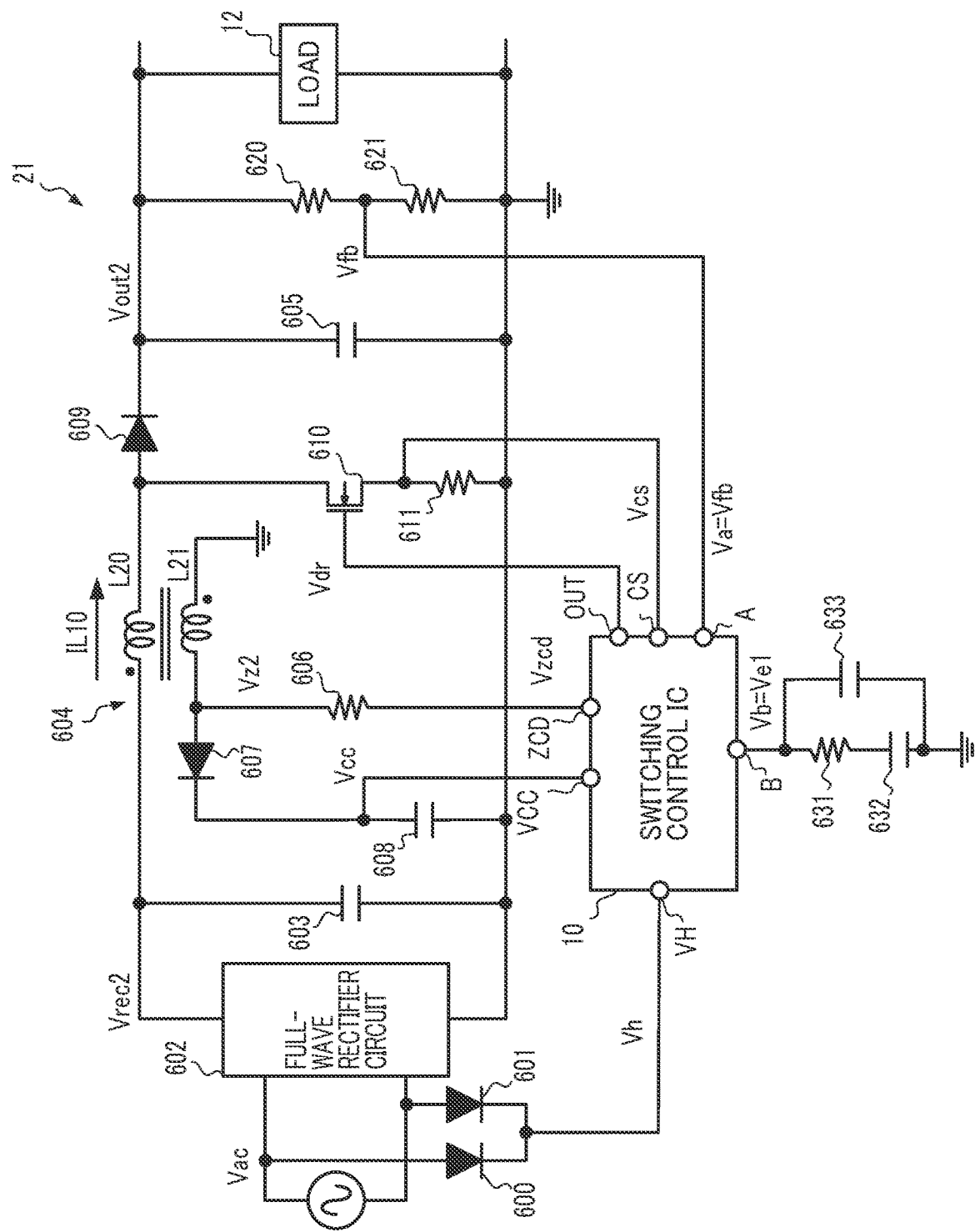
FIG. 10 is a diagram illustrating an example of a non-isolated power supply circuit 21.

FIG. 10 is a diagram illustrating a configuration example of a non-isolated power supply circuit 21. The power supply circuit 21 is a boost chopper AC-DC converter to generate the output voltage Vout2 of a target level Vo2 (e.g., 400 V) from the AC voltage Vac of the commercial power supply. Note that a load 12 of the power supply circuit 21 is an electronic device such as a DC-DC converter, a microcomputer, and the like. Further, the power supply circuit 21 corresponds to a "second power supply circuit".

The power supply circuit 21 includes the switching control IC 10, diodes 600, 601, 607, 609, a full-wave rectifier circuit 602, capacitors 603, 605, 608, 632, 633, a transformer 604, resistors 606, 611, 620, 621, 631, and an NMOS transistor 610.

The switching control IC 10 is the control IC explained with reference to FIG. 1, and controls switching of the NMOS transistor 610 such that the level of the output voltage Vout2 reaches the target level Vo2 while improving the power factor of the power supply circuit 21.

The diodes 600, 601 full-wave rectify the AC voltage Vac, to thereby output a resultant voltage, as the voltage Vh, to the terminal VH of the switching control IC 10.

The full-wave rectifier circuit 602 full-wave rectifies the AC voltage Vac, to thereby apply a resultant voltage, as a rectified voltage Vrec2, to the capacitor 603 and a main coil L20 of the transformer 604. Note that the rectified voltage Vrec2 corresponds to a "first rectified voltage".

The capacitor 603 is an element to smooth the rectified voltage Vrec2.

The transformer 604 includes the main coil L20 and an auxiliary coil L21 magnetically coupled to the main coil L20. Here, in an embodiment of the present disclosure, the windings of the auxiliary coil L21 are formed such that the voltage generated at the auxiliary coil L21 is opposite in polarity to the voltage generated at the main coil L20.

A resistor 606 is provided between one end of the auxiliary coil L21 and the terminal ZCD, and a voltage Vz2 generated at the auxiliary coil L21 is applied to the terminal ZCD as the voltage Vzcd.

Further, the diode 607 and the capacitor 608 are provided between one end of the auxiliary coil L21 and the ground, and thus the capacitor 608 is charged with the voltage Vz2. Then, in an embodiment of the present disclosure, the charge voltage of the capacitor 608 is supplied as the power supply voltage Vcc of the switching control IC 10.

The capacitor 605 configures a boost chopper circuit, with the main coil L20, the diode 609, and the NMOS transistor 610. Thus, the charge voltage of the capacitor 605 results in the DC output voltage Vout2.

The NMOS transistor 610 is a power transistor to control power of the load 11. Note that, in an embodiment of the present disclosure, the driving signal Vdr to drive the NMOS transistor 610 is outputted from the terminal OUT of the switching control IC 10.

The resistor 611 is an element to detect the inductor current IL10 flowing through the main coil L20 in response to the NMOS transistor 610 being turned on. The resistor 611 has one end coupled to the NMOS transistor 610 and the terminal CS, and the other end that is grounded. Thus, the voltage Vcs, which corresponds to the inductor current IL10 and is obtained by converting the inductor current IL10, is generated at the terminal CS.

The resistors 620, 621 configure a voltage divider circuit to divide the output voltage Vout2, to thereby generate a feedback voltage Vfb which is to be used when switching the NMOS transistor 610. Note that the feedback voltage Vfb generated at the node at which the resistors 620, 621 are coupled is applied to the terminal A. Thus, in the power supply circuit 21, the voltage Va at the terminal A is the feedback voltage Vfb. In this case, the resistors 620, 621 are equivalent to the circuit 800b illustrated in FIG. 2B.

The resistor 631 and the capacitor 632, as well as the capacitor 633 are elements for phase compensation to stabilize the feedback loop of the power supply circuit 21, and are provided between the terminal B and the ground. Note that the voltage Vb at the terminal B is the above-described error voltage Ve1, which will be described later.

===Switching Control IC 10 Used in Power Supply Circuit 21===

Figure 11:
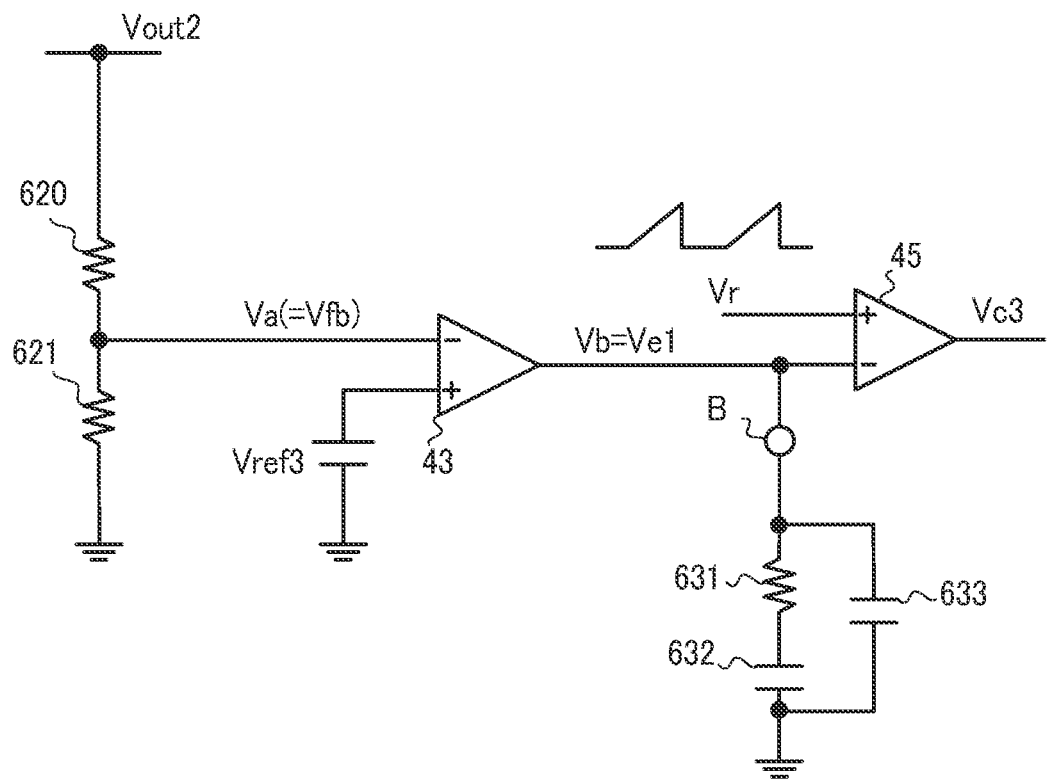
FIG. 11 is a diagram illustrating a configuration of a part of a switching control IC 10.

FIG. 11 is a diagram illustrating a configuration of a part of the switching control IC 10 used in the non-isolated power supply circuit 21. Here, since the voltage Va at the terminal A is lower than the predetermined level V2 illustrated in FIG. 2C, only the error amplifier circuit 43 out of the error amplifier circuit 43 and the error voltage output circuit 44 operates. Thus, the error amplifier circuit 43 charges the capacitor 633 at the terminal B and the like, and the error voltage Ve1 applied to the terminal B is the voltage Vb.

===Operation of Non-Isolated Power Supply Circuit 21===

Figure 12:
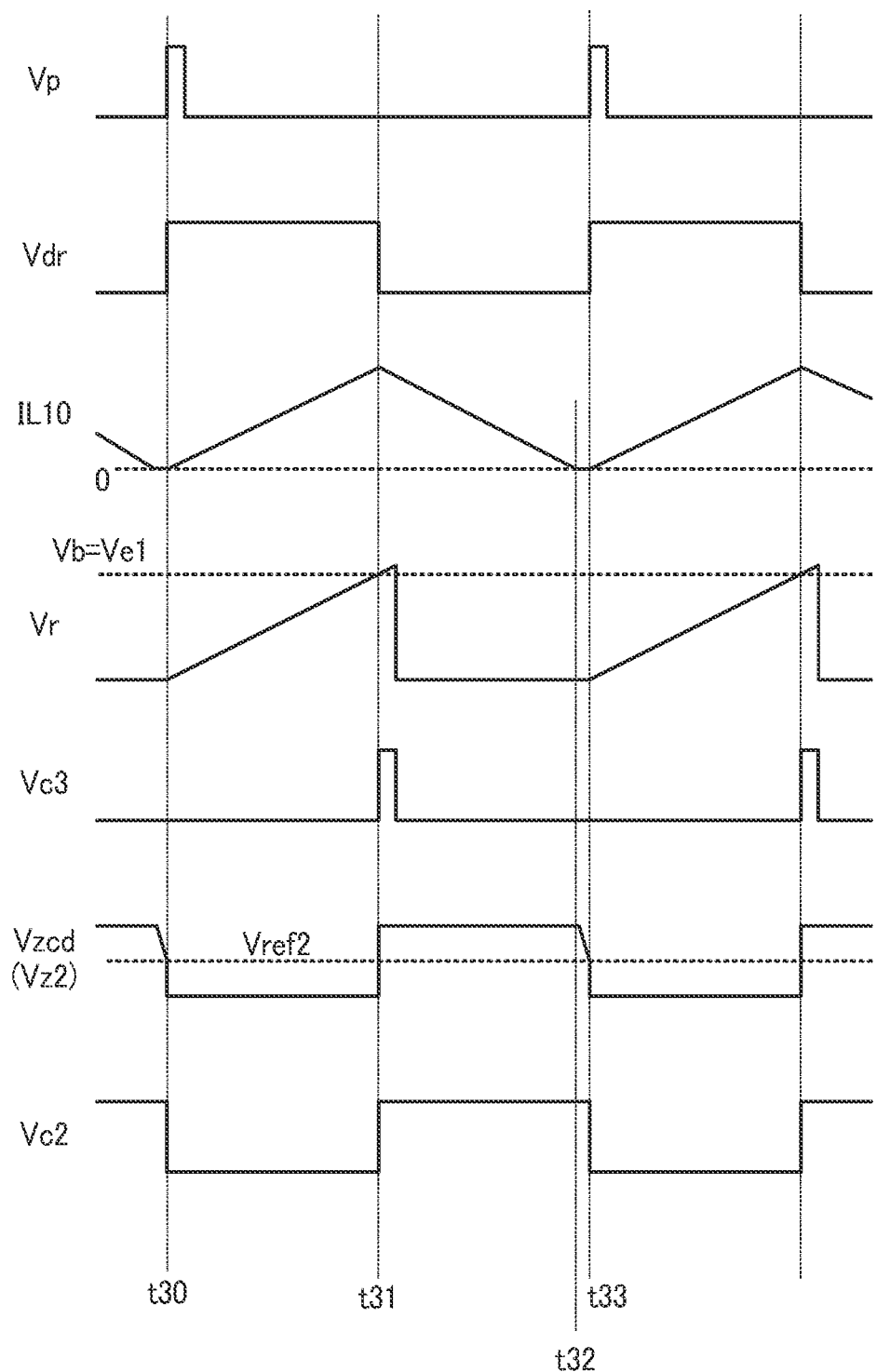
FIG. 12 is a chart for explaining the operation of a power supply circuit 21.

FIG. 12 is a diagram for explaining the operation of the switching control IC 10 used in the power supply circuit 21.

First, in response to the pulse signal Vp being outputted at time t30, the driving signal Vdr goes high and the NMOS transistor 610 is turned on. As a result, the inductor current IL10 flowing through the main coil L20 (inductor) increases. Further, in response to the pulse signal Vp being outputted, the amplitude of the ramp wave Vr from the oscillator circuit 42 increases.

Then, in response to the amplitude level of the ramp wave Vr rising above the level of the voltage Vb (=Ve1) at t31, the comparator 45 changes the signal Vc3 to high. As a result, the SR flip-flop 90 is reset, and the driving signal Vdr goes low.

In response to the driving signal Vdr going low, the NMOS transistor 610 is turned off, and thus the inductor current IL10 gradually decreases. Further, upon turning off of the NMOS transistor 610, the voltage on the input side (on the full-wave rectifier circuit 602 side) of the main coil L20 drops lower than the voltage on the output side (on the capacitor 605 side) of the main coil L20, and thus the voltage Vz2 at one end of an auxiliary coil L21 having the other end that is grounded becomes positive. As a result, the voltage Vzcd (=Vz2) exceeds the reference voltage Vref2, and thus the signal Vc2 from the comparator 40 goes high.

Then, in response to the inductor current IL10 reaching substantially zero at time t32, the voltage Vz2 of the auxiliary coil L21 magnetically coupled to the main coil L20 rapidly drops. As a result, the voltage Vz2 drops below the reference voltage Vref2 at time t33, and the signal Vc2 from the comparator 40 goes low.

In response to the signal Vc2 from the comparator 40 going low, the pulse signal Vp is outputted, and thus the NMOS transistor 610 is turned on. Then, from time t33, the operation from time t30 to t33 is repeated.

<<Overcurrent>>

Note that while the operation from time t30 to t33 is repeated, the inductor current IL10 may reach overcurrent. Here, in the power supply circuit 21, the condition B is satisfied. Thus, in response to the inductor current IL10 reaching the large current value I2 (>the current value I1), it is determined that the inductor current IL10 is overcurrent.

The comparator 47 outputs the high signal Vc4, when it is determined that the inductor current IL10 is overcurrent. As a result, the driver circuit 49 turns off the NMOS transistor 610, thereby being able to prevent the inductor current IL1 from increasing exceeding overcurrent.

===Feedback Control and Power Factor Correction===

Here, in the power supply circuit 21, in response to the output voltage Vout2 rising from the target level Vo2 (e.g., 400 V), the feedback voltage Vfb rises. As a result, the error voltage Ve1 drops, and the time period during which the NMOS transistor 610 is on decreases, and thus the output voltage Vout2 drops.

Meanwhile, in response to the output voltage Vout2 dropping from the target level Vo2, the feedback voltage Vfb drops. As a result, the error voltage Ve1 rises, and the time period during which the NMOS transistor 610 is on increases, and thus the output voltage Vout2 rises. As such, in the power supply circuit 21, the output voltage Vout2 is feedback controlled so as to reach the target level Vo2.

Accordingly, when the power supply circuit 21 generates the output voltage Vout2 of the target level Vo2 from the predetermined AC voltage Vac and supplies power to a constant load, the feedback voltage Vfb is constant. As a result, the error voltage Ve1 outputted from the error amplifier circuit 43 also results in being constant, and thus the time period during which the NMOS transistor 610 is on (e.g., time period from time t20 to t21) becomes constant.

Then, in response to the level of the voltage Vrec2, obtained by rectifying the AC voltage Vac, rising upon turning on of the NMOS transistor 610, the current value of the inductor current IL10 increases. As a result, the peak waveform of the inductor current IL10 results in the same waveform as the waveform of the voltage Vrec2, thereby improving power factor. Accordingly, the power supply circuit 21 operates as a power factor correction (PFC) circuit. As such, the switching control IC 10 can cause the non-isolated power supply circuit 21 to perform a desirable operation.

===Operation of Power Supply Circuit 21 from Startup===

When the above-described power supply circuit 20 is started up, the voltage Vb rises, and thus the time period during which the NMOS transistor 305 is on increases. Accordingly, when the effective value of the AC voltage Vac supplied to the power supply circuit 20 is 240 V, the overcurrent of the inductor current IL1 needs to be the small current value I1, to reduce the surge voltage Vsurge.

Figure 13:
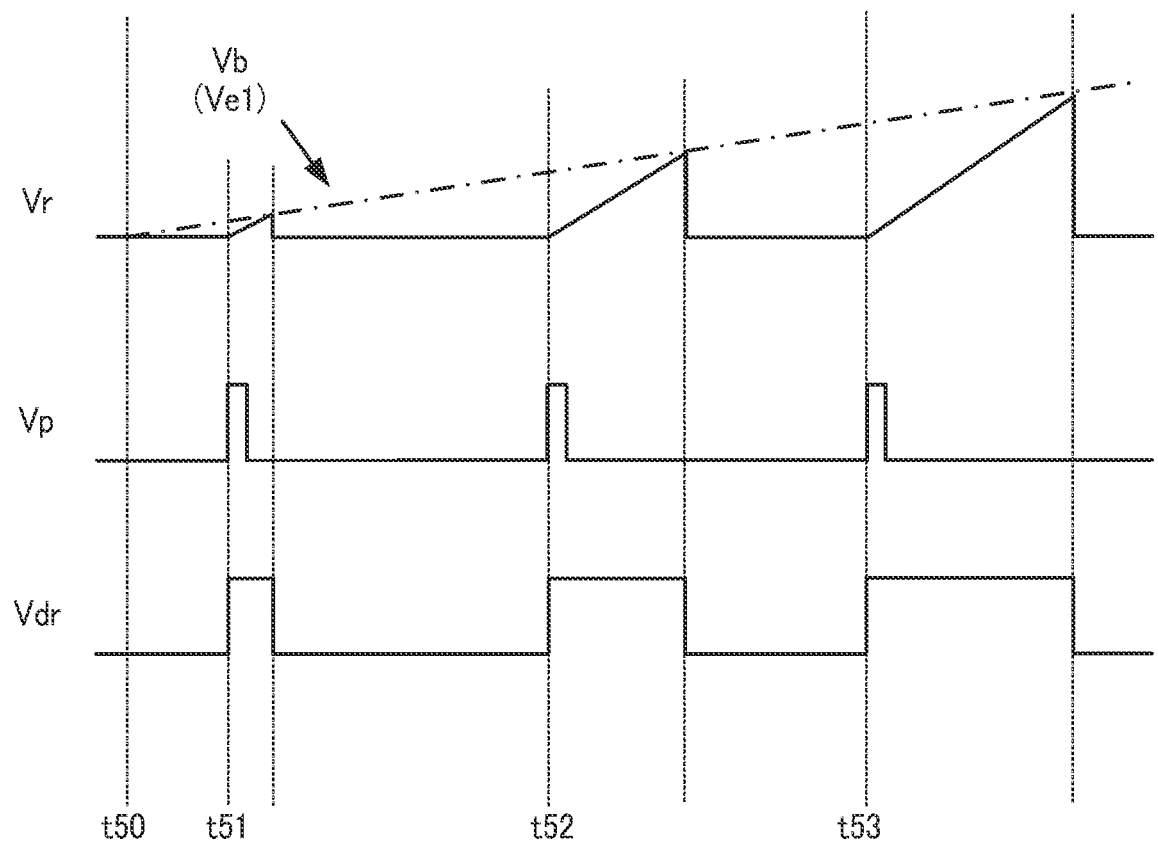
FIG. 13 is a chart for explaining the operation of a power supply circuit 21 at startup.

When the power supply circuit 21 is started up, the error amplifier circuit 43 charges the capacitors 632, 633 through the terminal B, as illustrated in FIG. 11, for example. Thus, as illustrated in FIG. 13, from time t50 at which the power supply circuit 21 is started up, the voltage Vb given by a dashed-dotted line gradually rises from 0. Note that, here, the switching control IC 10 is provided with a restart timer (not illustrated) to output the high pulse signal Vp in response to the time period during which the inductor current IL does not reach zero continuing for a predetermined time period.

Accordingly, in the power supply circuit 21, the on-time during which the NMOS transistor 610 is on gradually increases as given at each of time t51 to 53, and so-called soft start is achieved. Thus, in the power supply circuit 21, the overcurrent of the current IL10 being the large current value I2 makes it possible to reduce the startup time of the output voltage Vout2.

=== Summary ===

Hereinabove, the switching control IC 10 according to an embodiment of the present disclosure has been described. For example, the switching control IC 10 sets the overcurrent of the inductor current IL1 to the small current value I1, when the effective value of the AC voltage Vac is 240 V and the switching control IC 10 is used in the isolated power supply circuit 20. Thus, the surge voltage Vsurge can be suppressed, as illustrated in time t21 to t22 in FIG. 8.

Further, the switching control IC 10 includes the determination circuit 33 to determine whether the switching control IC 10 is used in the isolated power supply circuit 20 or in the non-isolated power supply circuit 21, and thus the current value of the overcurrent can be set to the small current value as needed.

Further, the identification circuit 60 includes the comparator 72 to detect whether the divided voltage Vd2 obtained by dividing the rectified voltage Vh exceeds the reference voltage Vref1, in other words, whether the level of the rectified voltage Vh exceeds the predetermined level corresponding to the reference voltage Vref1. Further, in response to the level of the divided voltage Vd2 exceeding the level of the reference voltage Vref1 in the comparator 72, the SR flip-flop 74 holds that the effective value of the AC voltage Vac is 240 V (first level). Accordingly, in an embodiment of the present disclosure, based on the output Q of the SR flip-flop 74, the reference voltage Vref4, Vref5 can be selected.

Further, the switching control IC 10 has the terminal VH to receive the rectified voltage Vh. Accordingly, the identification circuit 60 identifies the effective value of the AC voltage Vac, based on the voltage Vh applied to the terminal VH.

Further, in an embodiment of the present disclosure, the switching control IC 10 can be used in both the isolated power supply circuit and the non-isolated power supply circuit, but the present disclosure is not limited thereto. For example, the same or similar effect as in the an embodiment of the present disclosure can be achieved, even if the switching control IC 10 is an IC not including the error amplifier circuit 43 (i.e., IC dedicated for the isolated power supply circuit).

Further, for example, even if a switching control IC without the error amplifier circuit 43 is used, the surge voltage Vsurge generated at the startup of the flyback power supply circuit 20 can be suppressed.

Further, the switching control IC 10 is used in a flyback power supply circuit as the isolated power supply circuit 20, but the present disclosure is not limited thereto. For example, the types of the isolated power supply circuit 20 include forward type, push-pull type, half-bridge type, full-bridge type, and chopper type.

The present disclosure is directed to provision of a switching control circuit capable of suppressing surge voltage.

According to the present disclosure, it is possible to provide a switching control circuit capable of suppressing surge voltage.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a power supply circuit that is a first power supply circuit or a second power supply circuit, the power supply circuit being configured to receive an alternating current (AC) voltage and to generate an output voltage from the AC voltage, and including
    an inductor configured to receive a first rectified voltage corresponding to the AC voltage, and
    a transistor configured to control an inductor current flowing through the inductor,
the switching control circuit being configured to control switching of the transistor, the switching control circuit comprising:
    an identification circuit configured to identify whether an effective value of the AC voltage is a first level or a second level lower than the first level;
    a first comparator circuit configured to,
        in a first case in which the effective value is the first level and the power supply circuit is the first power supply circuit, compare the inductor current with a first current value, and
        in a second case in which the effective value is the second level and the power supply circuit is the first power supply circuit or the second power supply circuit, compare the inductor current with a second current value larger than the first current value; and
    a driver circuit configured to drive the transistor, based on the inductor current and the output voltage, wherein
    the driver circuit is configured to turn off the transistor, in response to the inductor current exceeding a current value to be compared out of the first current value and the second current value.

2. The switching control circuit according to claim 1, further comprising:
    a determination circuit configured to determine whether the power supply circuit is the first power supply circuit or the second power supply circuit; and
    a reference voltage output circuit configured to, based on a result of determination of the determination circuit and a result of identification of the identification circuit,
        output a first reference voltage corresponding to the first current value, in the first case,
        output a second reference voltage corresponding to the second current value, in the second case, wherein
    the first comparator circuit compares a voltage corresponding to the inductor current and an output of the reference voltage output circuit.

3. The switching control circuit according to claim 1, wherein the identification circuit includes
    a second comparator circuit configured to compare a level of a second rectified voltage corresponding to the AC voltage with a predetermined level, and
    a holding circuit configure to hold a result of identification indicating that the effective value is the first level, in response to the level of the second rectified voltage exceeding the predetermined level.

4. The switching control circuit according to claim 3, wherein
the switching control circuit is an integrated circuit, and has a terminal to receive the second rectified voltage.

5. The switching control circuit according to claim 1, wherein
the first power supply circuit is an isolated power supply circuit, and
the second power supply circuit is a non-isolated power supply circuit.

6. A switching control circuit for a power supply circuit configured to receive an alternating current (AC) voltage and to generate an output voltage from the AC voltage, the power supply circuit including
an inductor configured to receive a first rectified voltage corresponding to the AC voltage, and
a transistor configured to control an inductor current flowing through the inductor,
the switching control circuit being configured to control switching of the transistor, the switching control circuit comprising:
an identification circuit configured to identify whether an effective value of the AC voltage is a first level or a second level lower than the first level;
a first comparator circuit configured to,
when the effective value is the first level, compare the inductor current with a first current value, and
when the effective value is the second level, compare the inductor current with a second current value larger than the first current value; and
a driver circuit configured to drive the transistor, based on the inductor current and the output voltage, wherein
the driver circuit is configured to turn off the transistor, in response to the inductor current exceeding a current value to be compared out of the first current value and the second current value.

7. A power supply circuit that is an isolated power supply circuit configured to generate an output voltage of a target level from an alternating current (AC) voltage, the power supply circuit comprising:
an inductor configured to receive a rectified voltage corresponding to the AC voltage;
a transistor configured to control an inductor current flowing through the inductor; and
a switching control circuit configured to control switching of the transistor, wherein
the switching control circuit includes
an identification circuit configured to identify whether an effective value of the AC voltage is a first level or a second level lower than the first level,
a first comparator circuit configured to,
when the effective value is the first level, compare the inductor current with a first current value, and
when the effective value is the second level, compare the inductor current with a second current value larger than the first current value, and
a driver circuit configured to drive the transistor, based on the inductor current and the output voltage; and
the driver circuit is configured to turn off the transistor, in response to the inductor current exceeding a current value to be compared out of the first current value and the second current value.

8. The power supply circuit according to claim 7, wherein the power supply circuit is a flyback circuit.

* * * * *